US012572673B2

(12) United States Patent
Hellwig et al.

(10) Patent No.: US 12,572,673 B2
(45) Date of Patent: Mar. 10, 2026

(54) HIERARCHICALLY CONFIGURED INTERCONNECT-BASED ACCESS MECHANISM

(71) Applicant: Infineon Technologies AG, Neubiberg (DE)

(72) Inventors: Frank Hellwig, Wunstorf (DE); Richard Landenbach, Erzhausen (DE); Kai Dieffenbach, Egelsbach (DE); Uwe Moslehner, Geiselbach (DE); Stephan Stilkerich, Ottobrunn (DE)

(73) Assignee: Infineon Technologies AG, Neubiberg (DE)

( * ) Notice: Subject to any disclaimer, the term of this patent is extended or adjusted under 35 U.S.C. 154(b) by 91 days.

(21) Appl. No.: 18/657,862

(22) Filed: May 8, 2024

(65) Prior Publication Data

US 2025/0348601 A1     Nov. 13, 2025

(51) Int. Cl.
*G06F 21/60* (2013.01)
*G06F 21/85* (2013.01)

(52) U.S. Cl.
CPC ............ *G06F 21/604* (2013.01); *G06F 21/85* (2013.01)

(58) Field of Classification Search
CPC ................. G06F 21/604; G06F 21/606; G06F 21/62–645; G06F 21/71; G06F 21/82; G06F 21/85
See application file for complete search history.

(56) References Cited

U.S. PATENT DOCUMENTS

| | | | | |
|---|---|---|---|---|
| 2009/0300643 A1* | 12/2009 | Gove | ................. | G06F 9/30101 |
| | | | | 718/106 |
| 2012/0303848 A1* | 11/2012 | Vallapaneni | .......... | G06F 13/364 |
| | | | | 710/110 |
| 2018/0095793 A1* | 4/2018 | Shivappa | .............. | G06F 9/5022 |

* cited by examiner

*Primary Examiner* — Kevin Bechtel
(74) *Attorney, Agent, or Firm* — Eschweiler & Potashnik, LLC

(57)          ABSTRACT

Systems, methods, and circuitries are provided for controlling access the secondary modules in a controller based on a two part identifier. In one example, a controller includes one or more primary modules, one or more secondary modules, and an interconnect. Each primary module is configured to generate access requests with respect to the one or more secondary modules. The interconnect couples the one or more primary modules to the one or more secondary modules. The interconnect is configured to assign a transaction identifier to each access request. The transaction identifier is mapped to a type of read and/or write access in one or more secondary modules and includes a main component mapped to an application in execution by the primary module that generated the access request, and a sub component mapped to a sub-task of the application in execution by the primary module that generated the access request.

11 Claims, 9 Drawing Sheets

HIERARCHICALLY CONFIGURED INTERCONNECT-BASED ACCESS MECHANISM

FIELD

The present disclosure relates generally to the field of processors and central processing units (CPUs) and more particularly to an access control system for a processing system that includes one or more primary modules that share access to one or more secondary modules.

BACKGROUND

Modern microcontroller units (MCUs) include system on chip (SoC) architectures in which an interconnect structure controls access to shared resources by one or more primary modules such as central processing units (CPUs), processing cores, virtual machines, and so on.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
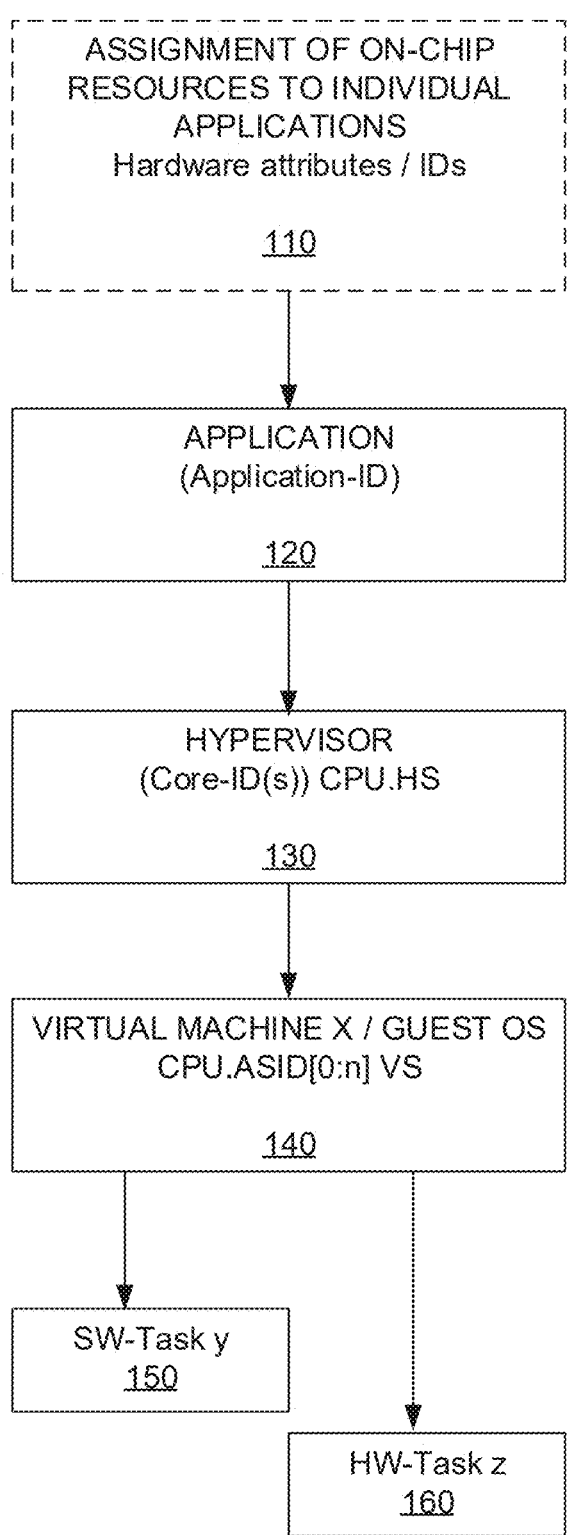
FIG. 1 is a diagram illustrating an example hierarchical configuration of access protection for multiple applications in execution on an MCU, in accordance with various aspects described.

The present disclosure is described with reference to the attached figures. Similar components in various figures may be represented by similar reference characters. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Multicore microcontroller units (MCUs) may execute multiple independent software applications simultaneously and often software isolation between the applications is required. The access protection mechanisms used by an MCU may be required to meet Automotive Safety Integrity Level D (ASILD) for applications with ASILD targets and security requirements with security targets. Multiple applications with different safety and security targets, (e.g., ASILD, Security, QM, and so on) may be referred to herein as applications with mixed criticality.

Each application in execution on an MCU uses a subset of the MCU's on-chip resources such as a CPU (e.g., core, virtual machine) for software execution and memory, direct memory access (DMA), and so on. Different applications may have different requirements regarding the allocation of on-chip resources as between applications as well as the allocation of on-chip resources to different sub-tasks associated with each individual application.

FIG. 1 illustrates the hierarchical nature of isolation requirements in a multi-application environment. Level 110, which is optional, assigns on-chip resources to different applications during MCU startup. Level 110 ensures isolation between different applications. Level 120 corresponds to a single application, identified by an Application ID. Multiple other applications (not shown) feature similar isolation. The application includes one or more hypervisors at hypervisor level 130. Each hypervisor controls one or more physical cores, each of which is identified by a core-ID or CPU.HS indicator. Each hypervisor controls multiple virtual machines (level 140). Each virtual machine may be identified by CPU.VMID[0:m] where VMID is virtual machine ID or VS indicator. Each VM may have its own ASIL-related isolation requirement. Each VM includes a Guest OS that performs multiple software tasks 150 and hardware tasks 160. The software tasks may be identified by CPU.MSID[0:m] or CPU.ASID[0:m] if a hypervisor is not used. Here ASID means address space identifier. Each software and hardware task may have its own ASIL-related isolation requirement. An example of an ASILD hardware task that may be assigned to a software task is a DMA with hardware ASILD protection through lockstep or functional redundancy support. Non-ASILD hardware tasks that may be assigned to software tasks include DMA without functional redundancy, CAN XL DMA channels, GETH/LETH DMA channels, PCIe, and so on. It can be seen that applications with mixed criticality present a challenge to providing proper isolation.

One approach to access restriction with respect to shared resources is memory management unit (MMU)-based "real" virtualization. This technique provides access control and address translation from virtual to physical addresses to support virtualization. MMU-based virtualization may be implemented as two-level MMU such as hypervisor/virtual machine. Typically MMU/IOMMU access control is performed on the primary side of the MCU, which can result in long access times due to the management overhead during runtime.

Access restriction may alternatively be provided through configurable, hardware-based, access protection mechanisms within the MCU such as memory protection units (MPUs) or physical memory protection (PMP). Individual CPU cores may include MPUs that protect SW access to the CPU's local memory as well as system memory. Two-level MPU may be supported for CPUs with hardware "pseudo" virtualization (e.g., virtualization without address conversion). Two-level MPU provides fast, deterministic access times and scales, in terms of hardware, with the number of regions.

A system MPU (also called a bus MPU or interconnect MPU) is an extension of CPU MPU and protects access through a system interconnect by the primary side functions to secondary side functions and memory that is accessible to the system interconnect. The system MPU is usually implemented on the secondary side and decides, according to its configuration, if a read/write access request is enabled for access. On-chip primary modules (e.g., CPUs with privilege modes, CPU VMs, DMA controllers, debug interface, and so on) are assigned to transaction identifiers on the primary side of an interconnect. The transaction identifiers are routed as part of each transaction through the interconnect. A configurable transaction ID check is performed at the secondary module (e.g., shared resource) to determine if the primary module associated with the transaction identifier has read/write access.

When an MCU is concurrently executing multiple independent applications with different safety/security related constraints, existing transaction identifier/MMU/MPU based solutions may not provide the necessary granularity for access protection as between applications and, within applications, between application tasks with mixed criticality.

Recognizing the hierarchical nature of the isolation requirements in a multi-application environment as shown in FIG. 1, a hierarchical access protection configuration system may be suitable. In a first step, a central initial software driver may be instantiated at startup that divides the MCU on-chip resources (e.g., CPUs, VMs, memory, DMA channels, and so on) into respective groups and assigns the groups to respective applications. This purpose of this step is to protect, by way of an access protection system, a group of resources associated with a given application from interference by other groups assigned to other applications.

In a second step, trusted instances of the applications (e.g., a hypervisor or operating system (OS)) confirm that all expected resources have been allocated to them and then, independently and in parallel, map the application's allocated on-chip resources to respective application tasks. The purpose of this step is to configure the access protection system to protect the tasks associated with the application from interference as against one another.

It is noted that the central initial software driver may only be available for a limited time. Further, the central initial software driver may not know, at startup, the details of the different applications and how these applications will used allocated hardware resources during runtime. Conflicts between applications (e.g., two applications claiming the same resource) should be detected during the initial resource allocation process. In multi-application access protection configuration, a hierarchical organization of on-chip resources should take place. For example, an application with a hypervisor may have on-chip resources allocated to it. An ASILD hypervisor of the application may allocate resources from the application's pool to its mixed critical virtual machines (VMs). Each ASILD VM may then allocate resources from its pool to its mixed critical tasks.

Described herein are systems, methods, and circuitries that assign MCU primary module sub-modules and secondary modules to two-part transaction identifiers, with each part of the two-part transaction identifier being assignable by different MCU entities. The two-part transaction identifiers have a main component associated with a particular application and a sub component associated with a sub-task of the application. In this manner, access protection on a per-application/application task basis as well as a hierarchical approach to configuration of transaction identifiers/on-chip resource allocation may be provided.

Figure 2:
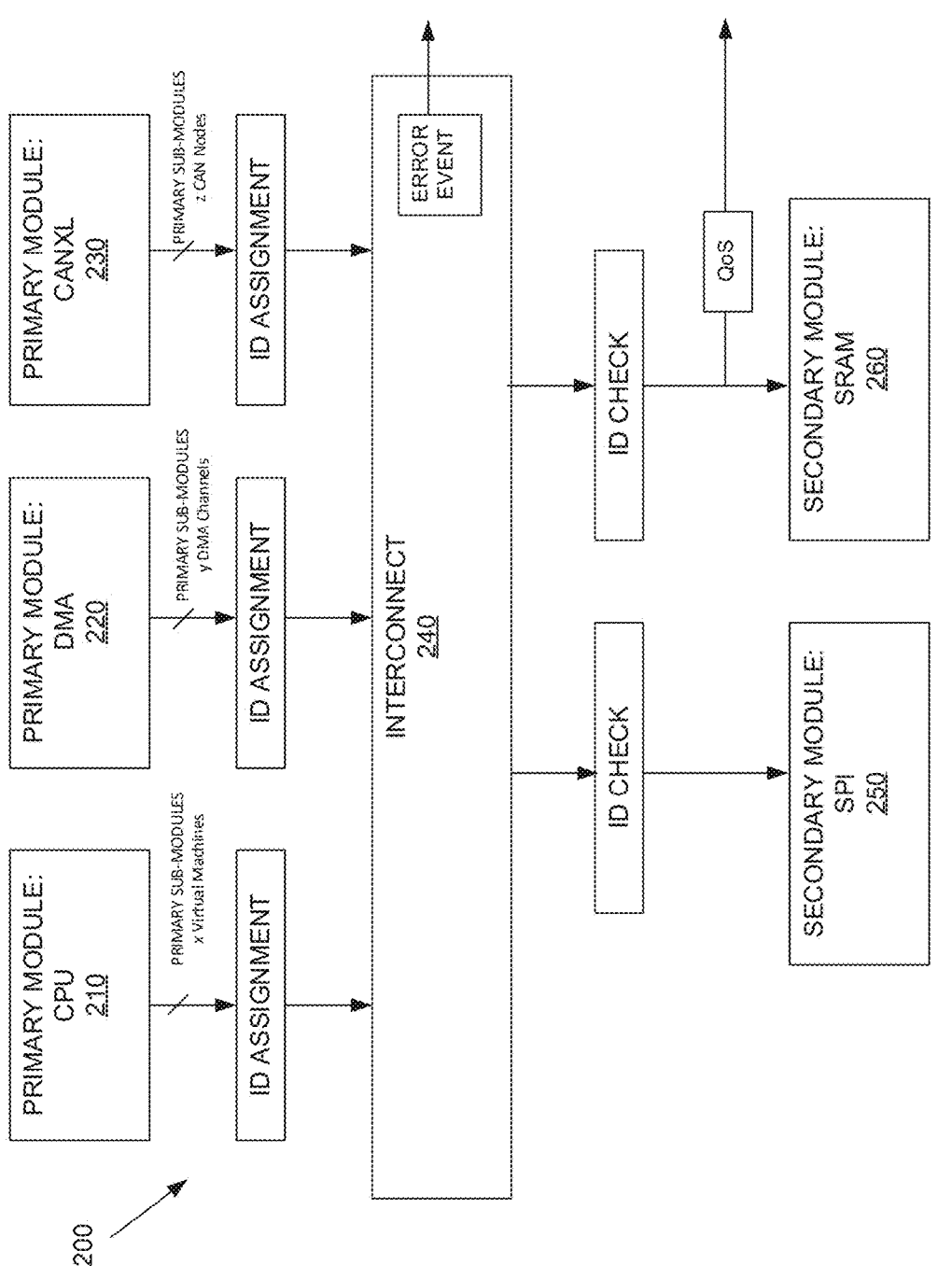
FIG. 2 is a block diagram of an example MCU architecture, in accordance with various aspects described.

FIG. 2 is a block diagram of an example MCU 200. The MCU 200 includes several modules that may be classified as either primary modules or secondary modules and an interconnect 240 that controls the routing of transactions between the primary and secondary modules. On the primary side, the MCU includes a CPU 210, direct media access (DMA) controller 220, and controller area network extended datafield length (CAN XL) nodes 230. A CAN XL provides an embedded DMA for each CAN XL node. Other examples for modules that could provide multiple primary modules each are peripheral component interconnect express (PCIe) modules, Ethernet and Gigabit Ethernet modules, and so on. An Ethernet or Gigabit Ethernet module provides multiple DMA channels that can be assigned to and used by different applications. Each primary module includes several primary module sub-modules that may be assigned to different applications. For example the CPU 250 may have submodules (e.g., groups of hardware components) that correspond to different privilege modes, virtual machines, operating systems, and so on, each which may be assigned to support different applications/application tasks. The DMA controller 220 may include several DMA channels that may be assigned to support different applications/application tasks. The CAN XL nodes 230 may be individually assigned to support different applications/application tasks.

Secondary modules are associated with shared resources or services and, in the illustrated example, include a serial peripheral interface (SPI) 250 and static random access memory (SRAM) 260. A transaction ID assignment process is used to assign transaction identifiers to the primary module sub-modules an a per application/application task basis. Transaction identifiers are mapped, at the secondary modules, to level or type of read and/or write access (e.g., read only, write only, read and write, neither read nor write). Different transaction identifiers that are mapped to the same read/write access are used in order to support configurable isolation as between primary module sub-modules, applications, tasks, and so on. This highly granular approach may be useful for isolation in the case of mixed criticality as between different applications and within applications as will be described in more detail below.

On the primary side of the interconnect, a transaction identifier is appended to transactions based on the originating entity (e.g., primary module sub-module/application/task) and at the secondary side of the interconnect an ID check is performed to determine if the transaction is enabled for read and/or write access. When the transaction identifiers identify a particular application, the transaction identifiers may also be used to observe each application's transactions to detect anomalies and to detect criticality of failed access or quality of service (QOS) events.

Figure 3:
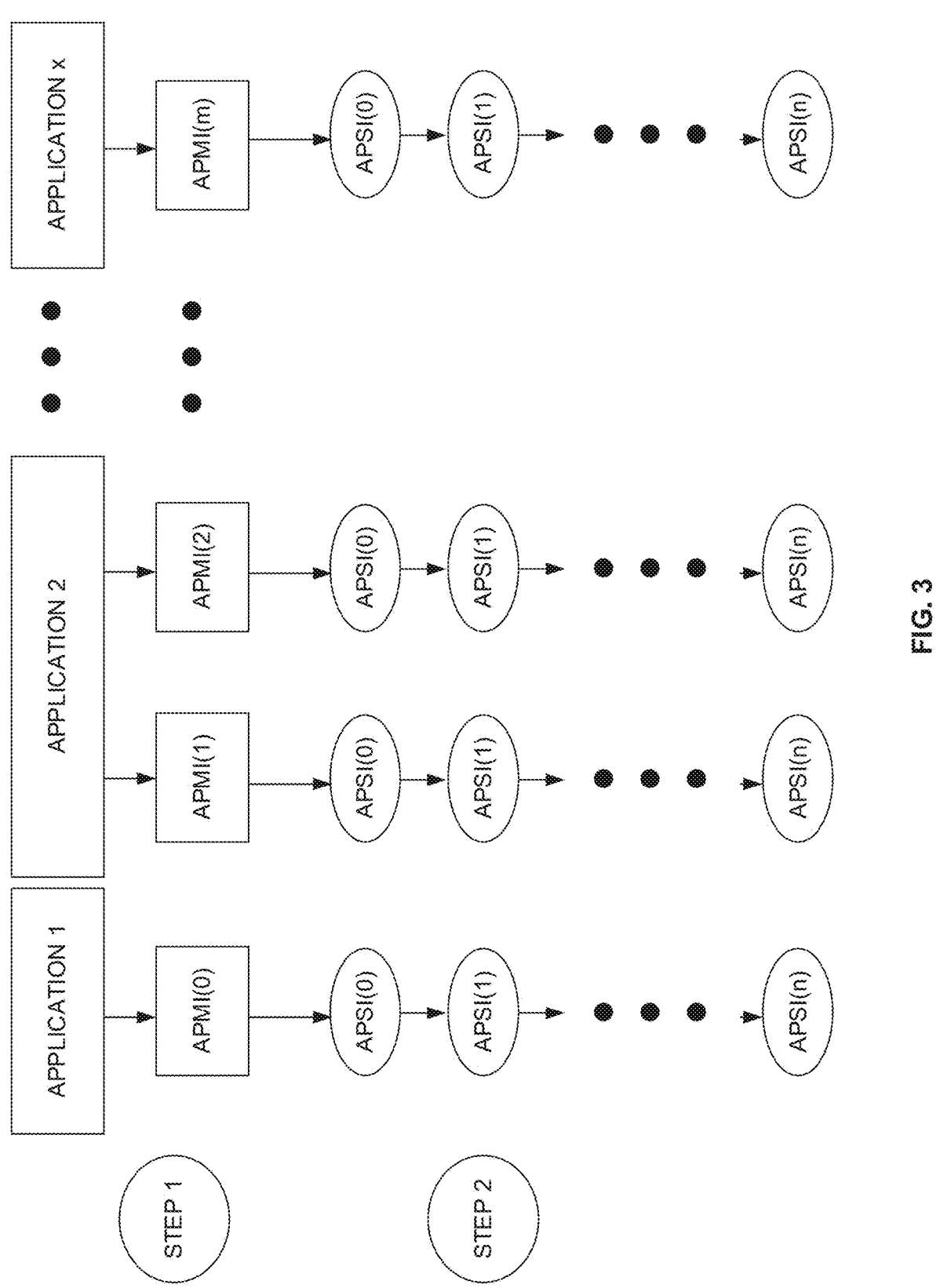
FIG. 3 is a block diagram illustrating transaction identifiers having an access protection main-ID (APMI) component and an access protection sub-ID (APSI) component, in accordance with various aspects described.

FIG. 3 illustrates the concept of two part transaction identifiers in which a first part, an access protection main-ID (APMI), provides a linear ID for application isolation and a second part, an access protection sub-ID (APSI), provides a linear ID for isolation within applications (e.g., on a per application sub-task basis). The APMI has m bits and the APSI has n bits. Each APMI is associated with a particular application and a set of APSIs. As such, some applications may have be mapped to more than one APMI. The number m may be selected to be able to encode a number roughly related to a number of main cores and special cores. The number n may scale based on the complexity of the applications and the need for isolation within the application. Registers used at the secondary module to store transaction IDs may include $m+2(2^n)$ bits. This may a reduction from $2 \times 2^{(m+n)}$ bits that would be needed to store transaction IDs that do not include separate linear IDs for the APMI and APSI.

FIG. 3 outlines an example access protection configuration process performed by an initialization entity or entities that provides hierarchical control of the configuration process. In a first step, groups of primary module sub-modules and secondary module functions or sub-modules are assigned to respective APMIs, where each APMI is associated with a specific application. An application may use more than one APMI to increase its ID space. This initial grouping may be done during startup in a centralized or distributed manner. For example, a central software driver may serve as the initialization entity for this part of the process. A central software driver may require a dedicated CPU because it is not known when or how often applications will configure and re-configure the APMI mapping. Alternatively, application hypervisors may act in parallel as the initialization entity to assign groups of primary module sub-modules and secondary modules to themselves. In this case the hypervisors may not know how the multiple VMs are intending to use the resources collected by the hypervisor for the VMs.

In a second step, application sub-tasks performed by the various primary module sub-modules are assigned to APSIs. The second step may be performed by each application, acting as an initialization entity. For example, the initialization entity may be an application hypervisor that may only change APSI mapping of its own on-chip resources without changing the configured APMI information. The hypervisor may either know the VMs and its VM internal requirements for software task isolation and can do the assignment to VMs directly or the VMs may request the hypervisor to allocate on-chip resources for their use. Conflicts between VMs will be detected by the hypervisor. For example if a VM is requesting on-chip resources not assigned to the application, this resource cannot be configured by the hypervisor because it has a different APMI.

Figure 4:
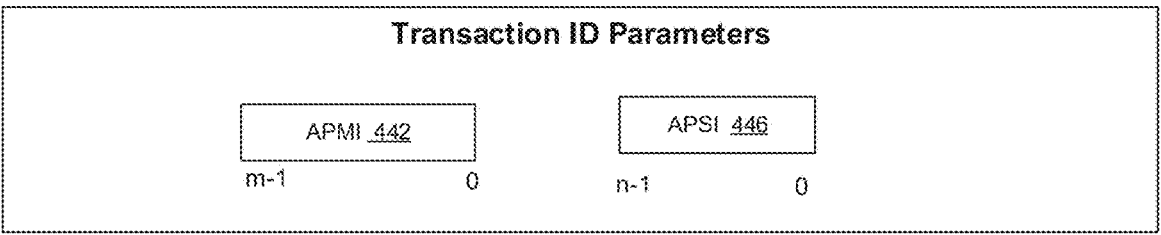
FIG. 4 is a block diagram illustrating exemplary bit allocations for APMI and APSI-related components, in accordance with various aspects described.
Figure 4:
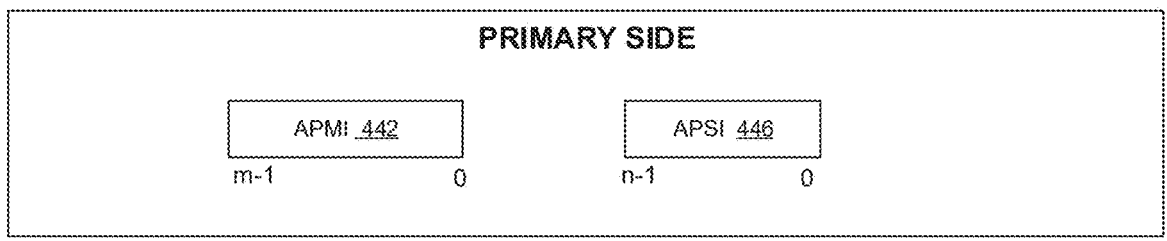
Figure 4:
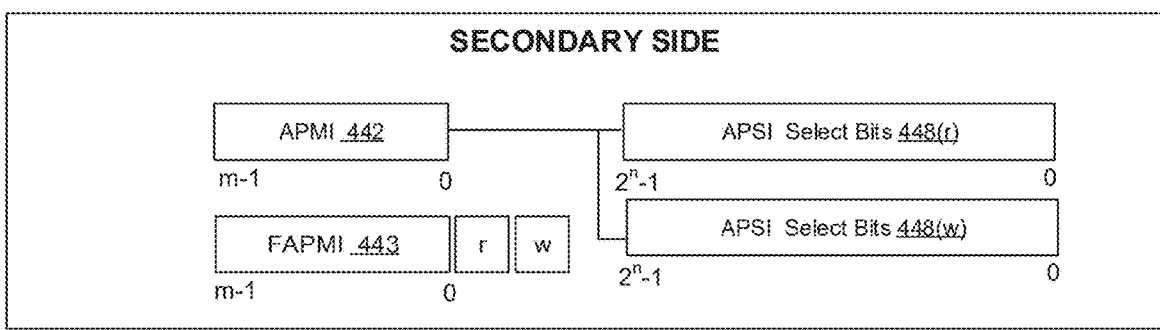
Figure 4:
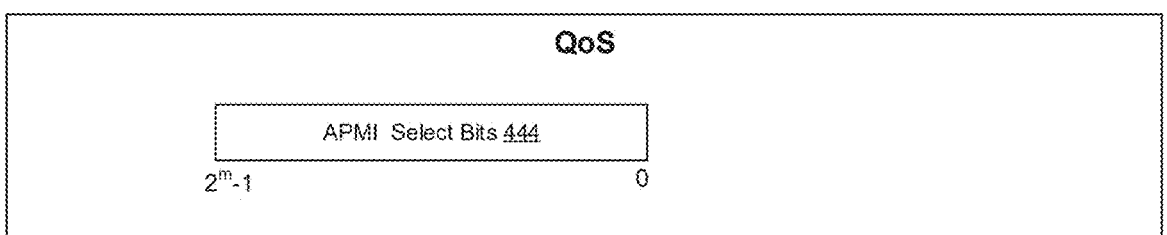

FIG. 4 illustrates an overview of the access protection scheme provided by the two part transaction identifier. The transaction ID includes an m bit APMI 442 and an n bit APSI 446. The APMI maps primary module sub-modules and secondary module sub-modules to applications. The APSIs may be used indicate different application sub-tasks. On the primary side, the transaction ID is appended to transactions or access requests using the m+n bit representation of the APMI 442 and APSI 446. On the secondary side, read and/or write access is controlled based on the APMI 442 and a value of one or more APSI select bits 448 mapped to the value of the APSI 446. In some examples, there are separate sets of $2^n$ read bits 448(r) and $2^n$ write bits 448(w) mapped to each APSI value.

The APMI values may be used for QoS observation and control, alarm handling and dependability, and control of cyber security activity visibility. APMI select bits 444 may be used to configure selected applications for which APMI values are tracked to observe the activities on the interconnect by these applications.

Flexible APMI (FAPMI) may be used for cross-application functions, such as debugging access or security observation. Each FAPMI is mapped to a particular type of read and/or write access in the secondary modules. Each cross-application function may be assigned to its own FAPMI. In some examples, each FAPMI includes an m bit identifier which, in a secondary device is associated with a read bit and a write bit mapped to the m bit identifier.

Figure 5:
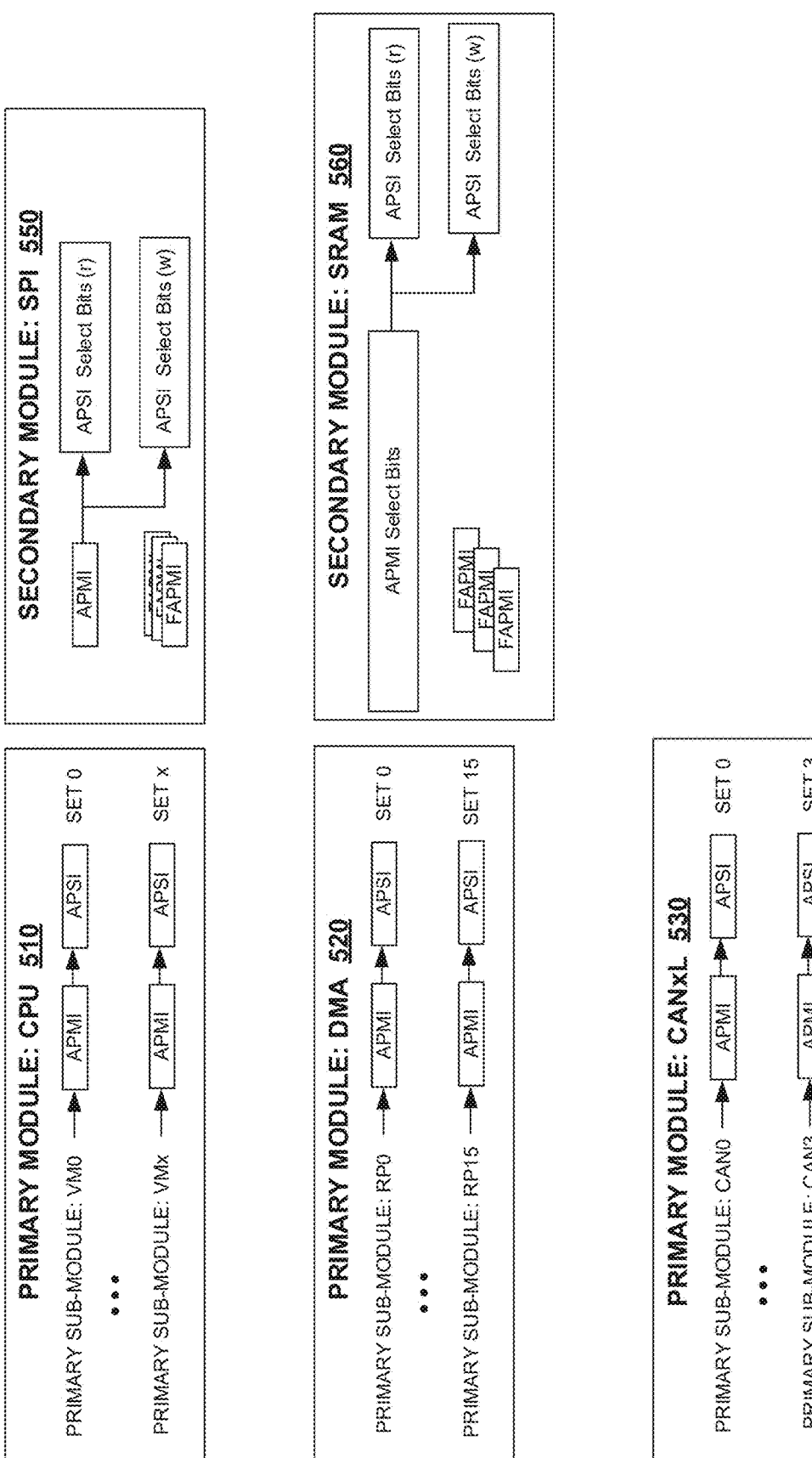
FIG. 5 is a block diagram illustrating an example of access protection for different virtual machines, tasks, and hardware, in accordance with various aspects described.

FIG. 5 illustrates an example mapping of primary module sub-modules and secondary modules to transaction identifiers. In the example, primary module CPU 510 supports up to x virtual machines, each of which is allocated a set of CPU resources. Primary module DMA 520 is divided into 16 sets of channels, each set corresponding to a sub-module or resource partition (RP) of the DMA 520. Primary module CAN XL 530 is divided into four CAN XL nodes, where each node can be assigned to a different application. Each CAN XL node includes its own DMA controller that represents a primary module function.

Each secondary module (e.g., SPI 550 and SRAM 560) includes an access protection (AP) check register that is used to check the transaction identifier of each incoming transaction. When a transaction identifier is received that includes an APMI that matches the stored APMI, the APSI select bits corresponding to the APSI are checked to determine read and/or write access that is authorized for the transaction. The secondary modules also store FAPMI values that are granted access to the secondary module based on a read or write bit of the FAPMI itself.

Figure 6:
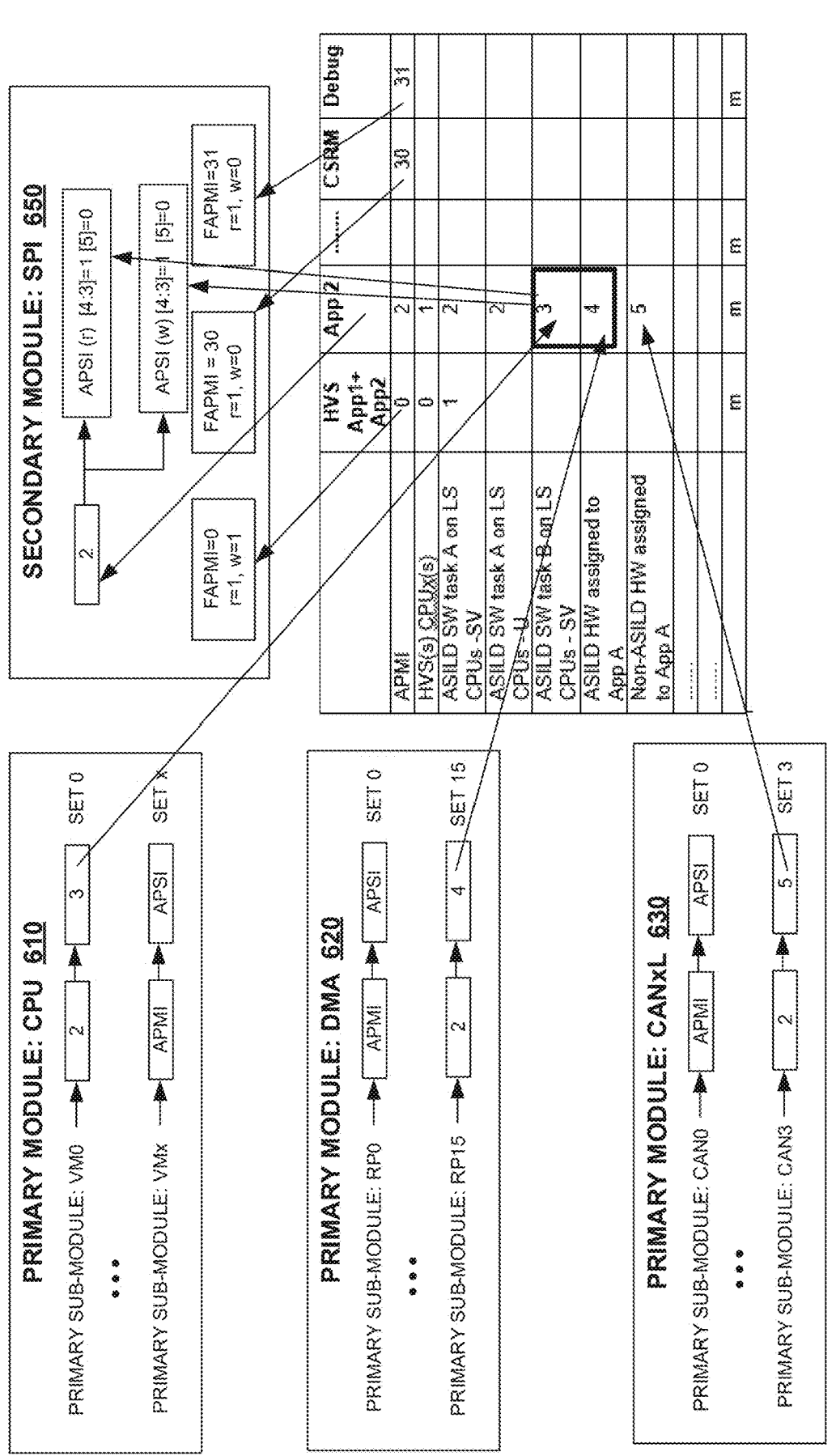
FIG. 6 is a block diagram illustrating an overview of an example mapping of primary module sub-modules and secondary module functions to applications, in accordance with various aspects described.

FIG. 6 illustrates an example mapping of primary module sub-modules to APMI/APSI components of transaction identifiers related to Application 2. For the example in addition to Application 2, the MCU includes a hypervisor that controls Application 1 and Application 2, a cybersecurity risk management (CSRM) function, and a debug function. Virtual machine VM0 is assigned APMI 2 to indicate that this set of CPU components is allocated for use by Application 2. Channel group RP15 of DMA 620 is assigned APMI 2 as is CAN XL node set 3. In the SPI, an access protection register is set with APMI 2.

VM0 is assigned APSI 3, which in Application 2 is mapped to an ASILD SW task B which is executing on lockstep (LS)-CPU components with privilege mode SV. DMA channel group RP15 is assigned APSI 4, which in Application 2 is mapped to ASILD hardware assigned to Application 2. CAN XL node set CAN3 is assigned APSI 5, which in Application 2 is mapped to non-ASILD hardware assigned to Application 2.

In the secondary module SPI 650, the read and write bits of the access protection registers are set according to the access to be granted to the application sub-task or hardware associated with the APSI. For example, if read and write access is to be granted to VM0 and DMA channel group RP15 then the APSI read and write select bits [4:3] corresponding to the APSI values assigned to these primary module sub-modules are set to 1. If CAN XL node set CAN3 (which is mapped as non-ASILD hardware) is to be prevented from accessing SPI 650, APSI read and write select bits [5] are set to 0.

For the cross-application functions, HVS, CSRM, and debug, a flexible APMI (FAPMI) is assigned and set in the access protection register for SPI 650. In the illustrated example, HVS is assigned to FAPMI0 which, in SPI 650, has both the read and write bits set. CSRM is assigned to FAPMI30 which has the read bit set but the write bit not set. The debug function is assigned to FAPMI 31 which has the read bit set but the write bit not set. When a transaction that includes one of these FAPMIs is received by the SPI 650, access will be granted based on the stored values for the read and write bits associated with the FAPMI.

Figure 7:
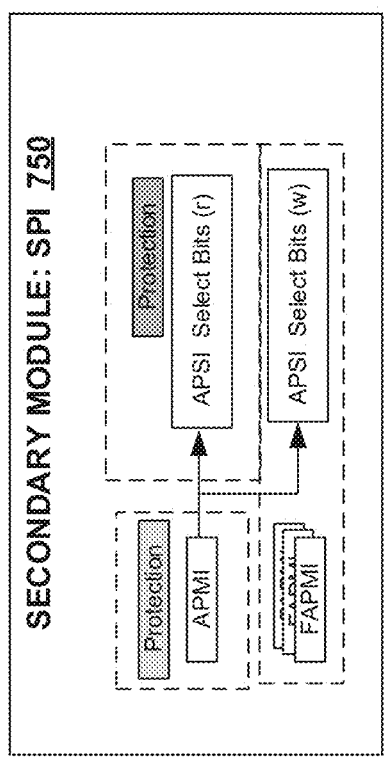
FIG. 7 is a block diagram illustrating an example protection mechanism for the assignment of primary module sub-modules to transaction identifiers, in accordance with various aspects described.
Figure 7:
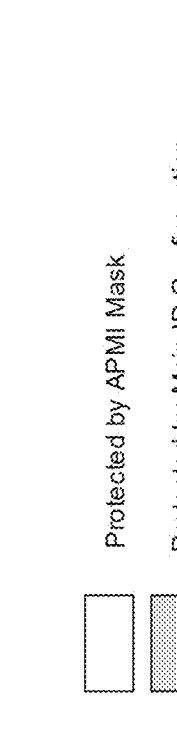
Figure 7:
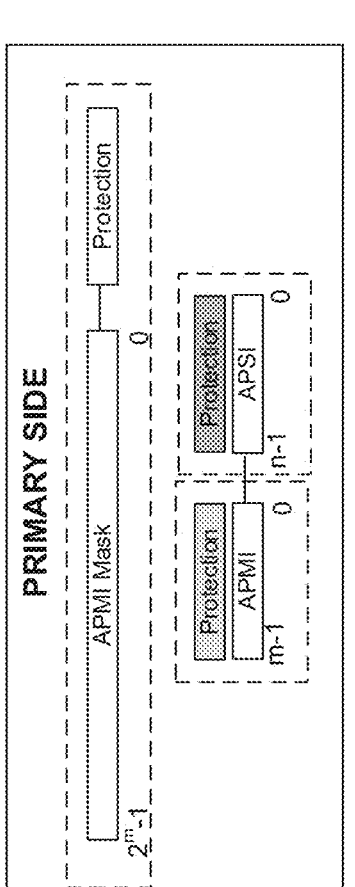
Figure 7:
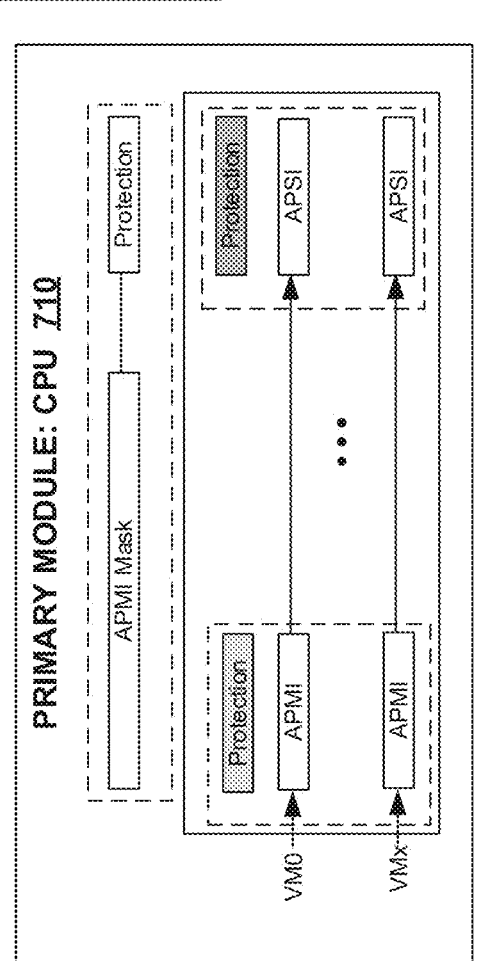

FIG. 7 illustrates an example access protection configuration protection scheme that prevents alterations to the configured access protection. On the primary side, the interconnect includes an APMI mask that may be set by a first-level initialization entity to prevent different APMI values from being configured by other entities. The APMI values to which the various primary module sub-modules and secondary modules are assigned are protected by virtue of the separation between the APMI assignment phase and the APSI assignment phase. The APMI assignment may only be performed by a trusted entity (e.g., first-level initialization entity) that is trusted by all applications. The APMI values may be locked by the trusted entity prior to the application-level configuration of APSI values. For example for CPU 710, APMI mask may be set by the trusted entity to enable only certain APMIs for certain applications to be configured. After the trusted entity sets the APMIs for VM0-VMx, and for SPI 750 those APMI values may be locked. The APSI assignment and setting of APSI select bits and FAPMI read and write bits may only be performed by a second-level initialization entity associated with a particular application and locked afterward.

Figure 8:
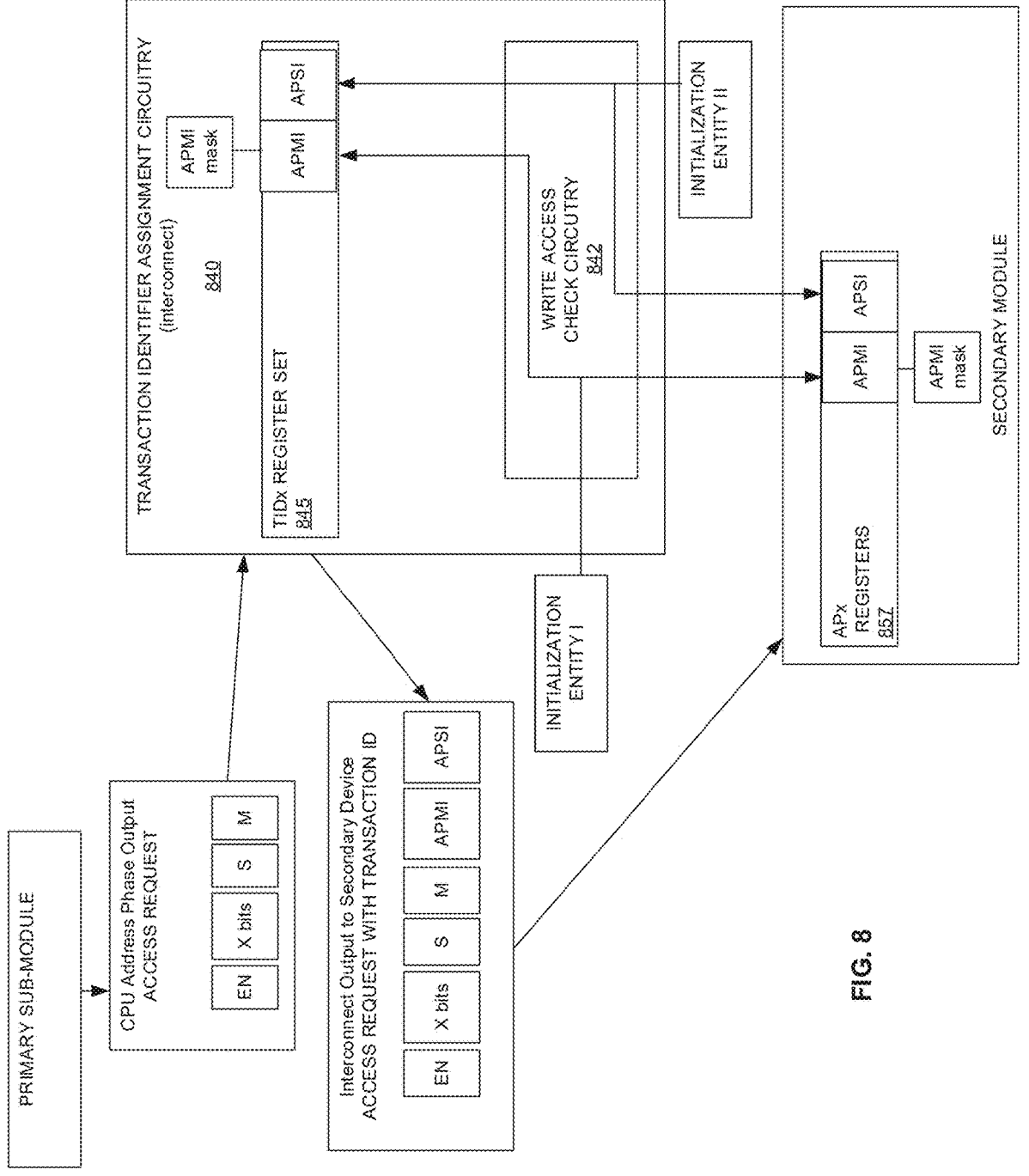
FIG. 8 is a block diagram illustrating an example assignment of primary module sub-modules to transaction identifiers, in accordance with various aspects described.

FIG. 8 illustrates an transaction identifier assignment circuitry 840, which may be implemented by an interconnect, that sets APMI and APSI values for access request based on values in the access request that identify a primary module sub-module that generated the request. For example, as seen in FIGS. 6 and 7, a certain CPU with a certain privilege level (e.g., Supervisor or Machine as indicated by fields S and M, respectively) may be assigned to a given APMI/APSI combination. This mapping may be stored in an transaction identifier (TID) register set 845. The transaction identifier assignment circuitry 840 appends the mapped APMI/APSI values to the access request as a transaction identifier. The access request including the transaction identifier is output by the interconnect to the secondary device. The secondary device checks the transaction identifier against its AP registers to determine what type of read and/or write access is to be granted to the access request.

During a transaction identifier configuration process, a first-level initialization entity, which may be a centralized driver or another entity trusted by all applications, writes values to APMI fields in the TID registers associated with the transaction identifier assignment circuitry 840 and the APx registers 857 in the various secondary modules. The first-level initialization entity may also set an APMI mask that protects the APMI fields in the TID registers 845 and AP registers 857 against changing of APMI values by any other entity. A second-level initialization entity, which may be associated with/trusted by a particular application then writes APSI values to APSI fields in the TID registers associated with the transaction identifier assignment circuitry 840 and the APx registers 857 (which may include read select bit arrays and write select bit arrays as illustrated in FIG. 7) in the various secondary modules.

Figure 9:
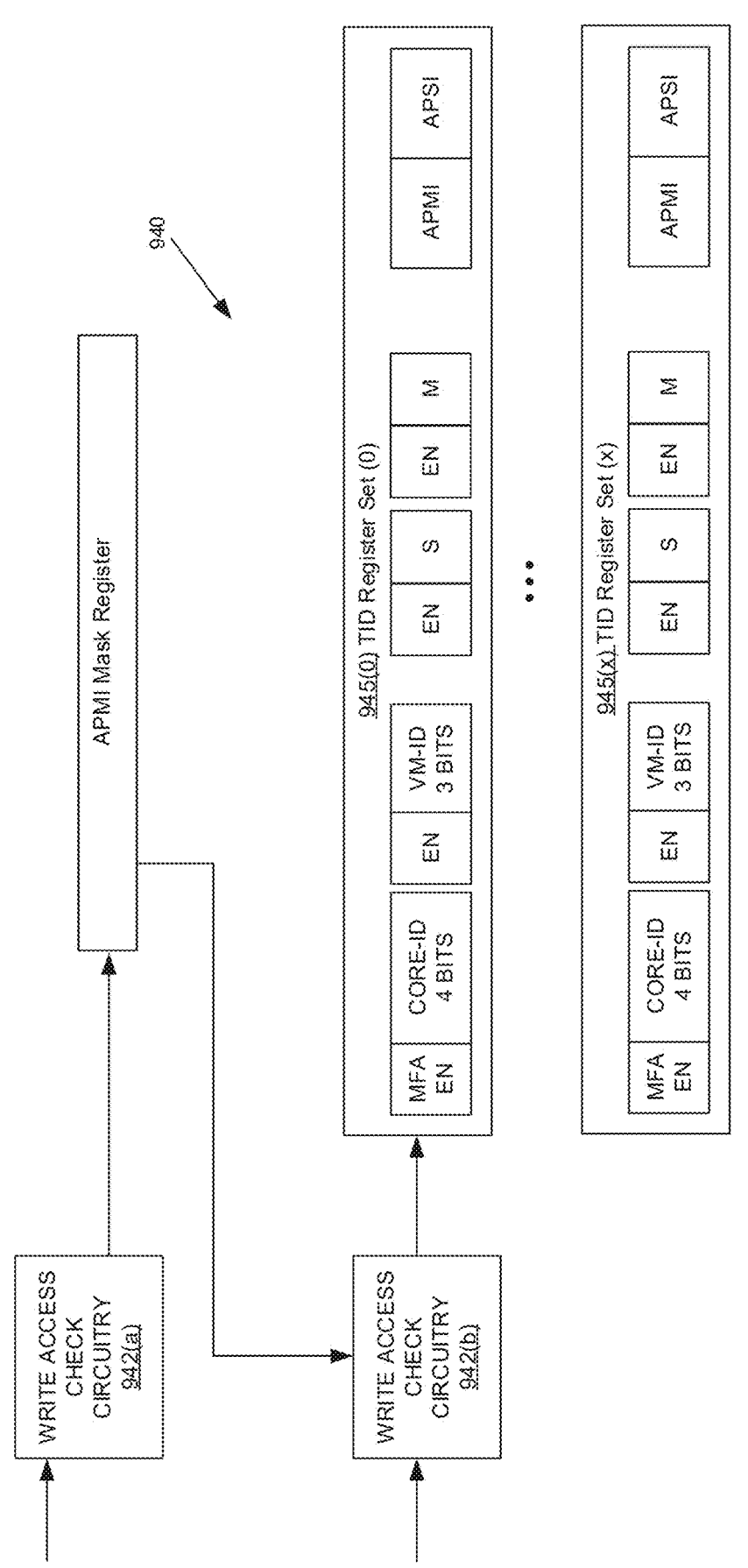
FIG. 9 is a block diagram illustrating an example protection mechanism for the assignment of primary module sub-modules to transaction identifiers, in accordance with various aspects described.

FIG. 9 is an overview of one example process for setting the mapping between APMI/APSI values and primary module sub-modules via TID assignment circuitry 940. The write path from the interconnect to the TID assignment circuitry's TID register sets 945 is illustrated by the arrows. In the register set, there will be one register per unique transaction identifier. The initialization entity or entities write values to the various registers to reflect a desired access protection configuration. There may be one TID assignment circuitry 940 per primary module sub-module, such as a CPU cluster. There are two separate checks on write instructions. Write access check circuitry 942(*a*) applies an APMI mask PROTMASK to the APMI value to determine whether the APMI value to be written is enabled for the APMI mask register. A second write access check circuitry 942(*b*) checks whether the writing of TID register values is enabled.

It can be seen from the foregoing description that the disclosed two part transaction identifier provides a mechanism for supporting hierarchical configuration of transaction identifiers based on an application level/application sub-task granularity.

In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term indicate when used with reference to some entity (e.g., parameter or setting) or value of an entity is to be construed broadly as encompassing any manner of communicating the entity or value of the entity either explicitly or implicitly. For example, bits within a transmitted message may be used to explicitly encode an indicated value or may encode an index or other indicator that is mapped to the indicated value by prior configuration. The absence of a field within a message may implicitly indicate a value of an entity based on prior configuration.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform operations according to embodiments and examples described herein.

EXAMPLES

Example 1 is a controller that includes one or more primary modules, one or more secondary modules, and an interconnect. Each primary module is configured to generate access requests with respect to the one or more secondary modules. The interconnect couples the one or more primary modules to the one or more secondary modules. The interconnect is configured to assign a transaction identifier to each access request. The transaction identifier is mapped to a type of read and/or write access in one or more secondary modules and includes a main component mapped to an application in execution by the primary module that generated the access request, and a sub component mapped to a sub-task of the application in execution by the primary module that generated the access request.

Example 2 includes the subject matter of example 1, including or omitting optional elements, wherein each secondary module is configured to provide read and/or write access for an access request based on the sub component of the transaction identifier included in the access request.

Example 3 includes the subject matter of example 1, including or omitting optional elements, wherein the transaction identifier includes a flexible main component, wherein the flexible main component is mapped to a type of read and/or write access, further wherein each secondary module is configured to provide the type of read and/or write access based on the flexible main component independent of the sub component in the transaction identifier.

Example 4 includes the subject matter of example 1, including or omitting optional elements, wherein the transaction identifier includes a first bit field encoding the main component and a second bit field, independent from the first bit field, that encodes the sub component.

Example 5 includes the subject matter of example 1, including or omitting optional elements, including an initialization entity that assigns respective primary module sub-modules to respective transaction identifiers based on an application and a sub-task of the application.

Example 6 includes the subject matter of example 5, including or omitting optional elements, wherein the initialization entity includes a central driver including dedicated hardware components or one or more applications configured to, in parallel, assign primary module sub modules executing the respective applications to transaction identifiers.

Example 7 includes the subject matter of example 5, including or omitting optional elements, wherein the initialization entity includes a first-level initialization entity configured to assign primary module sub-modules to respective main components based on a respective application to which the primary modules sub-modules are allocated; and a second-level initialization entity configured to assign respective primary module sub-modules allocated to an application to a respective sub component based on an application task for which the respective primary modules sub-module is allocated, wherein the first-level initialization entity and second-level initialization entity operate independently without sharing computing resources.

Example 8 includes the subject matter of example 1, including or omitting optional elements, wherein the interconnect includes a set of transaction identifier registers that map primary module sub-module identifying information in an access request to a unique main component sub component pair that corresponds to the transaction identifier for the primary module sub-module; and the secondary modules include a set of access protection registers that map transaction identifiers to types of read and/or write access.

Example 9 is a method for assigning primary modules sub modules to transaction identifiers, including with a first-level initialization entity, assigning respective primary module sub modules to respective transaction identifier main components, where each main component indicates an application in execution by the primary module sub module; and for each primary module sub module assigned to a same application, with a second-level initialization entity associated with the application, assign respective primary module sub modules to transaction identifier sub components, wherein each sub component indicates a sub-task of the application, wherein each transaction identifier is mapped to a type of read and/or write access by a secondary device.

Example 10 includes the subject matter of example 9, including or omitting optional elements, including assigning respective primary module sub modules to respective transaction identifier main components by setting a mask in an interconnect to mask transaction identifier main components not associated with a sub module of the primary module.

Example 11 includes the subject matter of example 10, including or omitting optional elements, including preventing the second-level initialization entity from setting the mask.

Example 12 is an interconnect coupling one or more primary modules to one or more secondary modules. The interconnect includes a plurality of transaction identifier (TID) registers and write check circuitry. Each TID register is configured to store an access request and a transaction identifier corresponding to an access request generated by a primary module of the one or more primary modules. The transaction identifier is mapped to a type of read and/or write access in one or more secondary modules and includes a main component mapped to an application in execution by the primary module that generated the access request a sub component mapped to a sub-task of the application in execution by the controller that generated the access request. The write access check circuitry is configured to prevent write access by entities other than a first initialization entity to a first portion of each TID register that stores the main component and prevent write access by entities other than a second initialization entity to a second portion of each TID register that stores the sub component.

Example 13 includes the subject matter of example 12, including or omitting optional elements, wherein the transaction identifier includes a flexible main component, wherein the flexible main component is mapped to a type of read and/or write access in secondary modules independent of a sub component in the transaction identifier.

Example 14 includes the subject matter of example 12, including or omitting optional elements, wherein the transaction identifier includes a first bit field encoding the main component and a second bit field, independent from the first bit field, that encodes the sub component.

Example 15 includes the subject matter of example 12, including or omitting optional elements, including a main component mask that prevents modification of the values stored in the first portion of each TID register.

Example 16 is a secondary module, including a plurality of access protection registers. Each access control register includes a first portion configured to store an access request corresponding to an access request generated by a primary module; a second portion configured to store a main component of a transaction identifier associated with the access request; and a third portion storing read selection bits and write selection bits each mapped to a sub component of the transaction identifier, wherein the secondary module controls read and/or write access in response to the access request based on a value of the read selection bits and/or write selection bits mapped to the subcomponent.

Example 17 includes the subject matter of example 16, including or omitting optional elements, wherein the main component is mapped to an application in execution by the primary module that generated the access request, and the sub component is mapped to a sub-task of the application in execution by the controller that generated the access request.

Example 18 includes the subject matter of example 16, including or omitting optional elements, including a main component mask that prevents modification of the values stored in the second portion of each access control register.

Example 19 includes the subject matter of example 16, including or omitting optional elements, wherein the second portion is configured to store a first bit field that encodes the main component and the third portion is configured to store a second bit field, independent from the first bit field, that encodes the sub component.

Example 20 includes the subject matter of example 16, including or omitting optional elements, wherein the second portion is configured to store a transaction identifier preconfigured as a flexible main component, wherein the second module controls read and/or write access based on a type of read and/or write access mapped to the flexible main component independent of the sub component of the transaction identifier.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example A or B is to be construed as include only A, only B, and both A and B. Further the phrase "one or more of" followed by A, B, or C is to be construed as including A, B, C, AB, AC, BC, and ABC.

What is claimed is:

1. A method for assigning primary hardware device sub-modules to transaction identifiers, comprising:

with a first-level initialization entity, assigning respective primary hardware device sub-modules to respective transaction identifier main components by setting a mask in an interconnect to mask transaction identifier main components not associated with a sub-module of the primary hardware device, where each main component indicates an application in execution by the primary hardware device sub-module;

for each primary hardware device sub-module assigned to a same application, with a second-level initialization entity associated with the application, assign respective primary hardware device sub-modules to transaction identifier sub-components, wherein each sub-component indicates a sub-task of the application, further wherein each transaction identifier is mapped to a type of read and/or write access by a secondary device; and preventing the second-level initialization entity from setting the mask.

2. A controller, comprising:

one or more primary hardware devices;

one or more secondary hardware devices;

wherein each primary hardware device is configured to generate access requests with respect to the one or more secondary hardware devices;

an interconnect coupling the one or more primary hardware devices to the one or more secondary hardware devices, the interconnect configured to assign a transaction identifier to each access request, wherein the transaction identifier is mapped to a type of read and/or write access in one or more secondary hardware devices and includes a main component mapped to an application in execution by the primary hardware device that generated the access request, and a sub-component mapped to a sub-task of the application in execution by the primary hardware device that generated the access request;

a first-level initialization entity, configured to assign respective primary hardware device sub-modules to respective transaction identifier main components by setting a mask in an interconnect to mask transaction identifier main components not associated with a sub-module of the primary hardware device; and one or more second-level initialization entities, each second-level initialization entity associated with an application and configured to, for each primary sub-module assigned to the application, assign respective primary sub-modules to transaction identifier sub-components, wherein the interconnect prevents the one or more second-level initialization entities from setting the mask.

3. The controller of claim 2, wherein each secondary hardware device is configured to provide read and/or write access for an access request based on the sub-component of the transaction identifier included in the access request.

4. The controller of claim 2, wherein the transaction identifier comprises a flexible main component, wherein the flexible main component is mapped to a type of read and/or write access, further wherein each secondary hardware device is configured to provide the type of read and/or write access based on the flexible main component independent of the sub-component in the transaction identifier.

5. The controller of claim 2, wherein the transaction identifier comprises a first bit field encoding the main component and a second bit field, independent from the first bit field, that encodes the sub-component.

6. The controller of claim 2, wherein the first-level initialization entity or the one or more second-level initialization entities comprise a central driver comprising dedicated hardware components or one or more applications configured to, in parallel, assign primary hardware device sub-modules executing the respective applications to transaction identifiers.

7. The controller of claim 2, wherein the interconnect comprises a set of transaction identifier registers that map primary hardware device sub-module identifying information in an access request to a unique main component sub-component pair that corresponds to the transaction identifier for the primary hardware device sub-module; and the secondary hardware devices comprise a set of access protection registers that map transaction identifiers to types of read and/or write access.

8. An interconnect configured to couple one or more primary hardware devices to one or more secondary hardware devices, the interconnect comprising

14 a plurality of transaction identifier (TID) registers, each configured to store an access request and a transaction identifier, wherein the access request corresponds to an access request generated by a primary hardware device of the one or more primary hardware devices, and wherein the transaction identifier is mapped to a type of read and/or write access in one or more secondary hardware devices and includes:

a main component mapped to an application in execution by the primary hardware device that generated the access request, and a sub-component mapped to a sub-task of the application in execution by the primary hardware device that generated the access request; and write access check circuitry configured to prevent write access by entities other than a first initialization entity to a first portion of each TID register that stores the main component, wherein the first initialization entity assigns respective primary hardware device sub-modules to respective transaction identifier main components by setting a main component mask in an interconnect to mask transaction identifier main components not associated with a sub-module of the primary hardware device; and prevent write access by entities other than a second initialization entity to a second portion of each TID register that stores the sub-component, wherein each second initialization entity is associated an application and assigns, for each primary hardware device assigned to the application, respective primary hardware device sub-modules to transaction identifier sub-components.

9. The interconnect of claim 8, wherein the transaction identifier comprises a flexible main component, wherein the flexible main component is mapped to a type of read and/or write access in secondary hardware devices independent of a sub-component in the transaction identifier.

10. The interconnect of claim 8, wherein the transaction identifier comprises a first bit field encoding the main component and a second bit field, independent from the first bit field, that encodes the sub-component.

11. The interconnect of claim 8, wherein the main component mask prevents modification of values stored in the first portion of each TID register.

* * * * *